(12) United States Patent  (10) Patent No.: US 9,032,297 B2
Lovejoy et al.  (45) Date of Patent: May 12, 2015

(54) WEB BASED VIDEO EDITING

(75) Inventors: Ian Lovejoy, San Francisco, CA (US); Ken Wang, Menlo Park, CA (US); Kevin Wong, Sunnyvale, CA (US); Eric Vossbrinck, San Jose, CA (US); Mark Moore, Burlingame, CA (US); Henry Dall, Pacifica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 67 days.

(21) Appl. No.: 11/276,927

(22) Filed: Mar. 17, 2006

(65) Prior Publication Data

US 2007/0234214 A1  Oct. 4, 2007

(51) Int. Cl.
*G11B 27/34* (2006.01)
*G11B 27/034* (2006.01)

(52) U.S. Cl.
CPC ............. *G11B 27/034* (2013.01); *G11B 27/34* (2013.01)

(58) Field of Classification Search
CPC ........................... G11B 27/34; H04N 5/44543
USPC .................................. 715/719, 720, 730, 723
See application file for complete search history.

(56) References Cited

U.S. PATENT DOCUMENTS

| | | | | |
|---|---|---|---|---|
| 5,559,949 A * | 9/1996 | Reimer et al. | | 715/720 |
| 5,740,388 A * | 4/1998 | Hunt | | 715/723 |
| 5,835,163 A | 11/1998 | Liou et al. | | |
| 5,884,056 A * | 3/1999 | Steele | | 715/738 |
| 5,999,173 A * | 12/1999 | Ubillos | | 715/724 |
| 6,006,265 A | 12/1999 | Rangan et al. | | |
| 6,085,195 A | 7/2000 | Hoyt et al. | | |
| 6,105,042 A | 8/2000 | Aganovic et al. | | |
| 6,134,547 A | 10/2000 | Huxley et al. | | |
| 6,154,771 A | 11/2000 | Rangan et al. | | |
| 6,167,442 A * | 12/2000 | Sutherland et al. | | 709/217 |
| 6,230,185 B1 * | 5/2001 | Salas et al. | | 709/205 |
| 6,320,600 B1 * | 11/2001 | Smith et al. | | 715/723 |
| 6,453,471 B1 * | 9/2002 | Klosterman | | 725/41 |
| 6,556,217 B1 * | 4/2003 | Makipaa et al. | | 345/667 |
| 6,574,655 B1 * | 6/2003 | Libert et al. | | 709/200 |
| 6,664,966 B1 * | 12/2003 | Ibrahim et al. | | 345/474 |
| 6,832,241 B2 * | 12/2004 | Tracton et al. | | 709/203 |

(Continued)

FOREIGN PATENT DOCUMENTS

| | | | |
|---|---|---|---|
| EP | 0780844 A2 | 6/1997 | |
| EP | 0780776 B1 | 7/2001 | |

(Continued)

OTHER PUBLICATIONS

"10 Tips for a Great Slide Show or Video Montage", http://www.ultimatewedding.com/articles/get.php?action=getarticle&articleid=1849. (observed Jan. 6, 2006), 3 pgs.

(Continued)

*Primary Examiner* — Phenuel Salomon
(74) *Attorney, Agent, or Firm* — Farjami & Farjami LLP

(57) ABSTRACT

A web based system for creating video compositions has a network connected interface generator for providing web pages to a user coupled to the network. A content library stores video clips and optionally images for use in creating the video composition or a sequence of video clips and/or images. A project database contains metadata for one or more projects that are being edited by a user via the network, and a rendering engine provides down resolutioned previews of a user selected project for viewing by a user via the network.

14 Claims, 13 Drawing Sheets

(56) References Cited

U.S. PATENT DOCUMENTS

| | | |
|---|---|---|
| 6,891,566 B2 | 5/2005 | Marchese |
| 6,947,959 B1* | 9/2005 | Gill ............................... 715/202 |
| 6,954,894 B1* | 10/2005 | Balnaves et al. ............. 715/202 |
| 7,216,008 B2* | 5/2007 | Sakata ........................... 700/94 |
| 7,242,406 B2* | 7/2007 | Robotham et al. ........... 345/581 |
| 7,443,418 B2* | 10/2008 | Bryant et al. ............. 348/207.1 |
| 7,814,416 B2* | 10/2010 | Shinkai ........................ 715/255 |
| 7,924,325 B2* | 4/2011 | Okuda et al. ................ 348/231.4 |
| 8,126,308 B2* | 2/2012 | Shibata et al. ............... 386/232 |
| 8,266,283 B2* | 9/2012 | Liebman ....................... 709/225 |
| 2001/0011262 A1 | 8/2001 | Hoyt et al. |
| 2002/0001395 A1* | 1/2002 | Davis et al. .................. 382/100 |
| 2002/0106191 A1 | 8/2002 | Betz et al. |
| 2002/0116716 A1* | 8/2002 | Sideman ........................ 725/91 |
| 2002/0133515 A1* | 9/2002 | Kagle et al. .................. 707/511 |
| 2002/0165856 A1* | 11/2002 | Gilfillan et al. ................. 707/3 |
| 2003/0051255 A1 | 3/2003 | Bulman et al. |
| 2003/0146915 A1* | 8/2003 | Brook et al. |
| 2004/0004957 A1 | 1/2004 | Rabipour et al. |
| 2004/0150663 A1* | 8/2004 | Kim .............................. 345/723 |
| 2004/0183817 A1* | 9/2004 | Kaasila ........................ 345/660 |
| 2005/0210414 A1 | 9/2005 | Angiulo et al. |
| 2005/0281535 A1* | 12/2005 | Fu et al. ......................... 386/69 |
| 2006/0174026 A1* | 8/2006 | Robinson et al. ............. 709/231 |
| 2006/0197879 A1* | 9/2006 | Covell et al. ................ 348/700 |
| 2006/0212833 A1* | 9/2006 | Gallagher et al. ........... 715/848 |
| 2006/0294571 A1* | 12/2006 | Moore et al. ................. 725/135 |
| 2007/0028172 A1* | 2/2007 | Greer et al. .................. 715/705 |
| 2007/0094601 A1* | 4/2007 | Greenberg et al. ........... 715/713 |
| 2007/0162487 A1* | 7/2007 | Frailey ......................... 707/102 |
| 2007/0214218 A1* | 9/2007 | Ward et al. ................... 709/205 |

FOREIGN PATENT DOCUMENTS

| | | |
|---|---|---|
| EP | 0840309 B1 | 11/2003 |
| EP | 1378911 A1 | 1/2004 |
| EP | 1242994 B1 | 11/2004 |
| GB | 2371896 | 8/2002 |
| WO | WO-99/52277 A1 | 10/1999 |
| WO | WO-00/33310 A1 | 6/2000 |
| WO | WO-00/39997 A2 | 7/2000 |
| WO | WO-01/07094 A1 | 2/2001 |
| WO | WO-01/46955 A2 | 6/2001 |
| WO | WO-01/52099 A1 | 7/2001 |
| WO | WO-02/061610 A1 | 8/2002 |

OTHER PUBLICATIONS

"D-Vision Video—Photo Montages", http://www.dvisionvideo.com/montage.htm, (observed Jan. 6, 2006), 6 pgs.

"Memories to Last A Lifetime", http://www.captiveimagesproduction.com, (Copyright (c) 2005, Captive Images Productions), (observed Jan. 6, 2006), 1 pg.

"Wedding Video Montage Slide-Show Specialists—DVDHome.ca", http://www.dvdhome.ca/montage, (observed Jan. 6, 2006), 4 pgs.

"Your Photographs on DVD—DVDPhotoPortfolios.com", http://downtownwestcliffe.com/westcliffefilms/dvdphotoportfolios.htm, (observed Jan. 6, 2006), 2 pgs.

* cited by examiner

WEB BASED VIDEO EDITING

BACKGROUND

Computer based video editing has been performed for many years, and provides many advanced special effects. Several software packages are available today that run on a computer, and allow a user to import video and edit video, and include music to create a movie or short video.

Such systems generally provide a complex user interface and have a steep learning curve to master the functions that are provided. There is a need for a simplified method of dealing with video and other content that allows users without video editing experience to quickly put together videos with little or no training.

SUMMARY

A web based video management system facilitates the quick creation, editing and streamed previewing of video content. A web based system for creating video compositions has a network connected interface generator for providing web pages to a user coupled to the network. A content library stores video clips, images and music for use in creating the video compositions, such as a sequence of video clips and/or images. A project database contains metadata for one or more projects that are being edited by a user or group of users via the network, and a rendering engine provides down resolutioned previews of a user selected project for viewing by a user via the network.

The video content may be uploaded via several methods to a content library. The upload may involve conversion of video and images to a normalized format. A project being created and edited may be previewed in the normalized format to facilitate streaming of the video in real time with little delay.

In one embodiment, a video clip is represented to a user as predetermined number of images from the clip, such as three images. The three images are used regardless of length of the video clip, more to help identify the content of the clip as opposed to the length of the clip. In further embodiments, video clips may be represented by a variable number of images. Such clips, and images in normalized format may be assembled in sequences, without initially dwelling on the length of time of the assembled set of clips and images.

In further embodiments, editing of the sequence of clips and images may be accomplished by selecting a clip or image, which results in a displayed menu of editing choices. This removes the complexity of having to select a function from a large list of functions, some of which may not even be applicable to the selected clip or image. The clip or image may then be edited, and the sequence viewed again. Clips and images in the sequence may be moved about to change their order. In one embodiment, a sequence number associated with the clip or image may be changed to indicate a new position within the sequence.

Music may be selected from a stock collection, or uploaded by a user from another source. Music may be associated with the sequence. The sequence may be previewed in real time. Once the sequence is fully edited and in a final desired form, the sequence may be rendered with high resolution source clips and images. The normalized sequence contains time stamps and editing metadata created during the editing process. The time stamps are used to select the correct high quality source, and the metadata is then applied to the source to produce an edited high quality video. The video may be burned onto DVD or other media and shipped in accordance with user instructions entered into an order module.

In further embodiments, the low resolution sequence may be linked in an embedded web video player that contacts a server for a video feed of the sequence, allowing references to the video in blogs, websites, emails and other communications. In further embodiments, sequences may be collaboratively edited, with editing metadata associated with each collaborative user.

DETAILED DESCRIPTION

Figure 1:
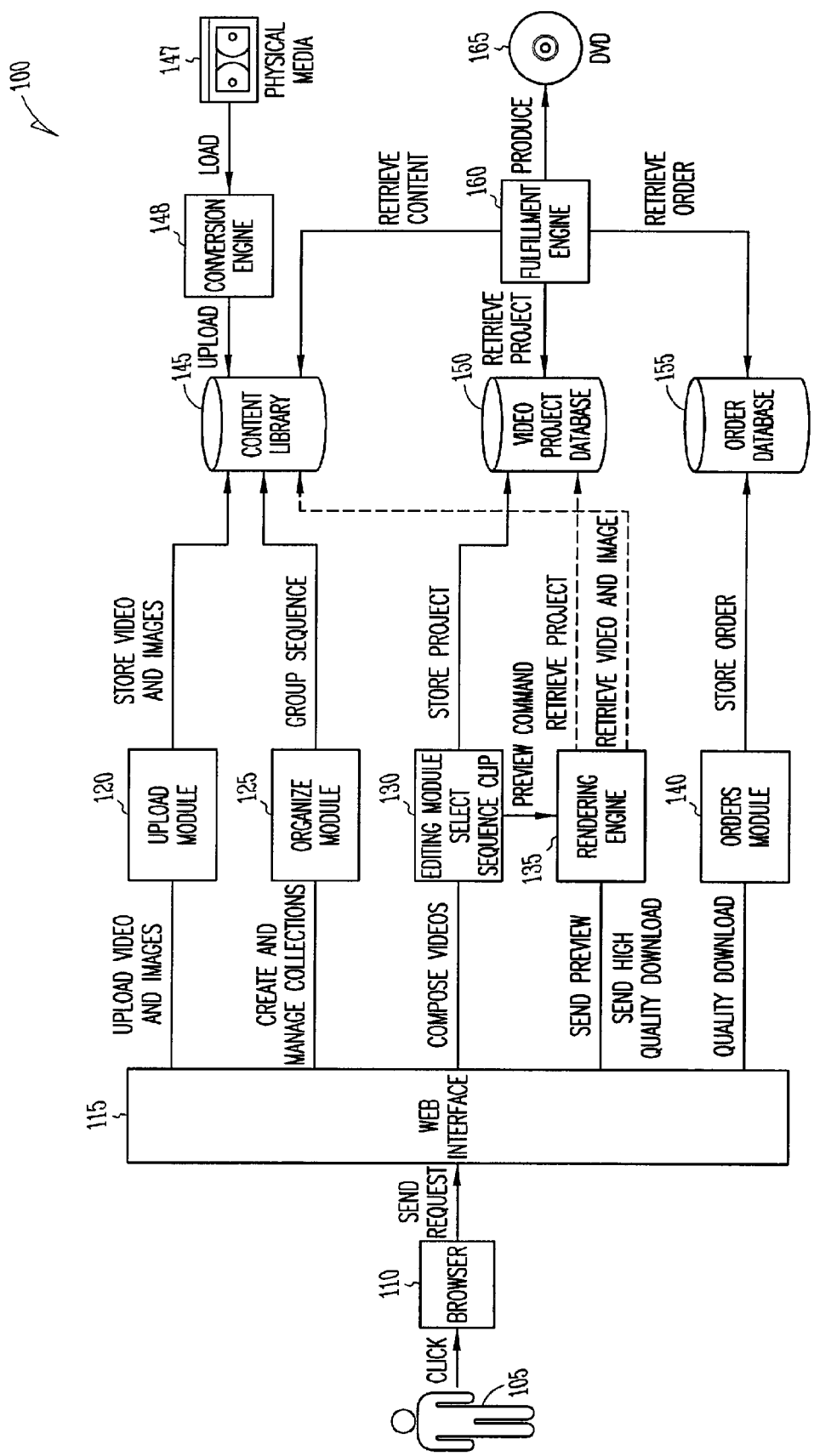
FIG. 1 is a block diagram of a web based video editing system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

A web based video and image editing system facilitates the creation of video compositions and photo books. Content, such as images, audio, video clips and text are stored on a networked server or database, and the system provides a web based interface that allows the user to select images, video clips and text to include in a video composition or photo book, which may be set to selected music or other audio. Context sensitive tool selection provides an easy interface that facilitates users who are inexperienced in editing content, to easily upload and organize the content, and create video compositions and photo books. The creations can be made viewable to other users, and may also be purchased in various real media, such as DVDs.

Using the web based system, video clips, images and text may be viewed as simple, customizable and interchangeable building blocks for putting together a project, such as a video composition or book. Each building block has properties specific to their type or kind, as well as common settable features of duration, effects, transition and sequence in the project. The term "video composition" refers to a user created video output that contains a selection of at least one video clips, but may contain all three of the content types listed above: video clips, images and text, and other types of content now known or later invented. A similar editing experience may also be used to create slideshows, books, film-loops or other multimedia creations, which, including video compositions, may be referred to as montages. In one embodiment, a montage has the look of a video based on effects applied to the content, and transitions between content, regardless of whether or not it contains a video clip.

A web based video editing system is indicated generally at 100 in FIG. 1. A user 105 may access the system 100 via a computer 110 or other device that is capable of running a browser. The user may send a request to a web interface 115, which provides interfaces to the user for many different video editing functions as illustrated by multiple modules. An upload module 120 provides functions for uploading digital content, such as video and images from digital media coupled to the user computer 110. In one embodiment, the upload module 120 normalizes the data, such as JPEG for images and MPEG2 for video and at the same time produces a down resolutioned version. Many other different video and image formats may be used, such as PNG and H.264, or whatever other coder/decoder format desired that provides good quality. The down resolutioned version, or lower resolution version may be used for editing and real time rendering for viewing over a network connection. In one embodiment, the down resolutioned version uses a compressed video format and compressed image format. Along with video and images, other media types or content types may also be used, such as text, which may be edited in various embodiments. Content may be uploaded by dragging and dropping or other methods in various embodiment.

An organize module 125 represents organizing functions that allow users to create and manage collections of digital content. The collections may be named and optionally searched for keywords, or even using image recognition, such as facial recognition to find desired content. An editing module 130 represents editing functions that allow the user to compose videos, such as by selecting digital content, sequencing it and clipping it. Such videos and other content, such as books, may be stored as projects. Content may be copied and/or transferred between various projects and collections. Many different functions may be provided and associated with specific digital content as described in examples below. Tools may be provided in menus that are associated directly with the content to which they apply. Thus, a different menu may appear when editing an image as opposed to a video clip, since different editing functions may apply to each.

A rendering engine 135 is also coupled to the web interface to enable the user to view previews of digital content being edited, such as a video sequence. An orders module 140 allows the user to place an order via the web interface 115. A content library 145 is a digital storage library, such as network attached storage, that stores video clips, images and music from upload module 120 and from other physical media as represented at 147. Physical media may be sent via mail to the conversion engine for uploading in one embodiment. An email may be sent to the user when the conversion and upload is completed, and the media returned to the user.

In one embodiment, a file system is used to store content for each user in a separate directory for each user. Physical media 147 may represent an analog video tape that may be run through a conversion engine 148. The conversion engine 148 may convert content from the physical media 147 to a selected digital format for storage in content library 145. In one embodiment, the content library 145 stores multiple normalized versions of the content. A higher resolution version is used for creating a final high resolution output. A lower resolution version is used for use in streaming the content.

A video project database 150 is coupled to the editing module 130, and stores projects that may be created by the user. A project may correspond to one particular event or subject for which a user may be creating and editing a video or video composition. For instance, a birthday party or graduation, or any other type of project utilizing digital content. The video project database 150 is a database in one embodiment that stores metadata for the project, such as titles and descriptions.

An order database 155 is coupled to the orders module 140, and stores orders. The orders may be communicated to a fulfillment engine 160, which retrieves orders, retrieves corresponding projects from project database 150 and source content from content library 145. In one embodiment, the project database contains lower resolution versions of video and images on which editing is performed. The editing may result in time stamps and metadata corresponding to editing of the lower resolution versions of the video and images. The fulfillment engine retrieves the source content and applies the metadata corresponding to time stamps in the lower resolution versions to the higher resolution video and images to produce an end product, such as a physical media 165 containing the resulting project. One or more copies of the physical media 165 may be mailed as specified in the order database.

In one embodiment, the lower resolution video and images are used by the rendering engine 135 to provide the previews to the user editing the project, and may also be used to provide previews to other users, who may have been given a link by the creating user. Such preview versions can be embedded in a Flash app or other viewing technology that contacts a network server for a corresponding video feed. A preview version that has been rendered, may be stored and streamed as desired. Further editing may result in a re-rendering of the video and images to create a new preview version.

Figure 2:
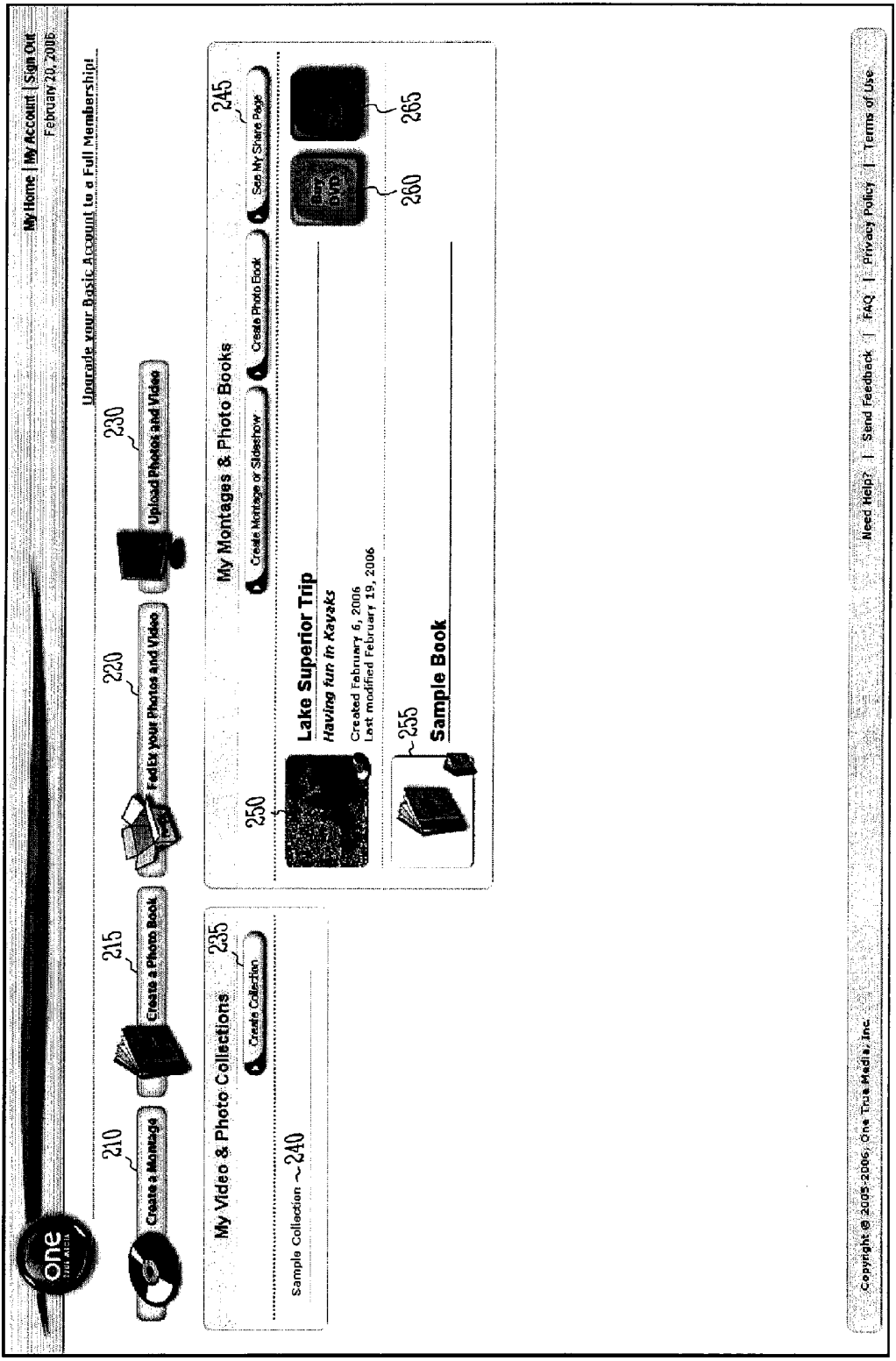
FIG. 2 is a screen shot of an example user web page providing an interface to collections of content and projects, provided by the system of FIG. 1.

FIG. 2 is a screen shot of a web page a user may see after signing onto the system 100. Several buttons or links are available for utilizing the system. A first set of function selections that are represented in one embodiment as buttons include create a montage or video composition 210, create a photo book 215, mail your photos and videos 220, and upload photos and videos 230. These selections take the user to various sets of screens from which the functions are implemented interactively with the user. Some will be shown and described below, such as the create functions.

The screen of FIG. 2 also provides an entry into a screen 200 that allows a user to create a collection at 235, and also a link to a sample collection 240. An area of the screen shows video compositions and photo books that have been created by the user, and also includes additional links to the create video compositions and photo books, as well as a selection to see a share page 245 where users can make their creations available for viewing by others.

One example video composition is indicated by a thumbnail image at 250, and is titled "Lake Superior Trip", with a subtitle of "Having fun in Kayaks". The dates of creation and last modification may be shown to help the user manage their creations. The thumbnail is the lowest resolution image (approximately 320 pixels wide) from the set of images or video clips created and stored by the system. The down-resolutioned version (approximately 640 pixels wide) of the content is used for previewing or otherwise streaming over the network for real time viewing. The source for the content as described above is the highest resolution version of the content. In this example, a sample video may be provided prior to the creation of a video by the user. Once the user creates a video, the sample may be removed.

A sample book is illustrated at 255, and is a collection of photos that have been arranged and optionally set to music. As with the video sample the sample book may be removed once the user creates a book. Some functions available for the video composition 250, include buying a DVD of the video composition at 260 and posting the video composition on the network or online at 265 for others to view. In one embodiment, a video composition can be easily and automatically converted into a photo book by using images from video in the video composition and other images already in the video composition. The system can create it automatically and may also allow the user to select different images from video clips that were in the video composition.

Figure 3:
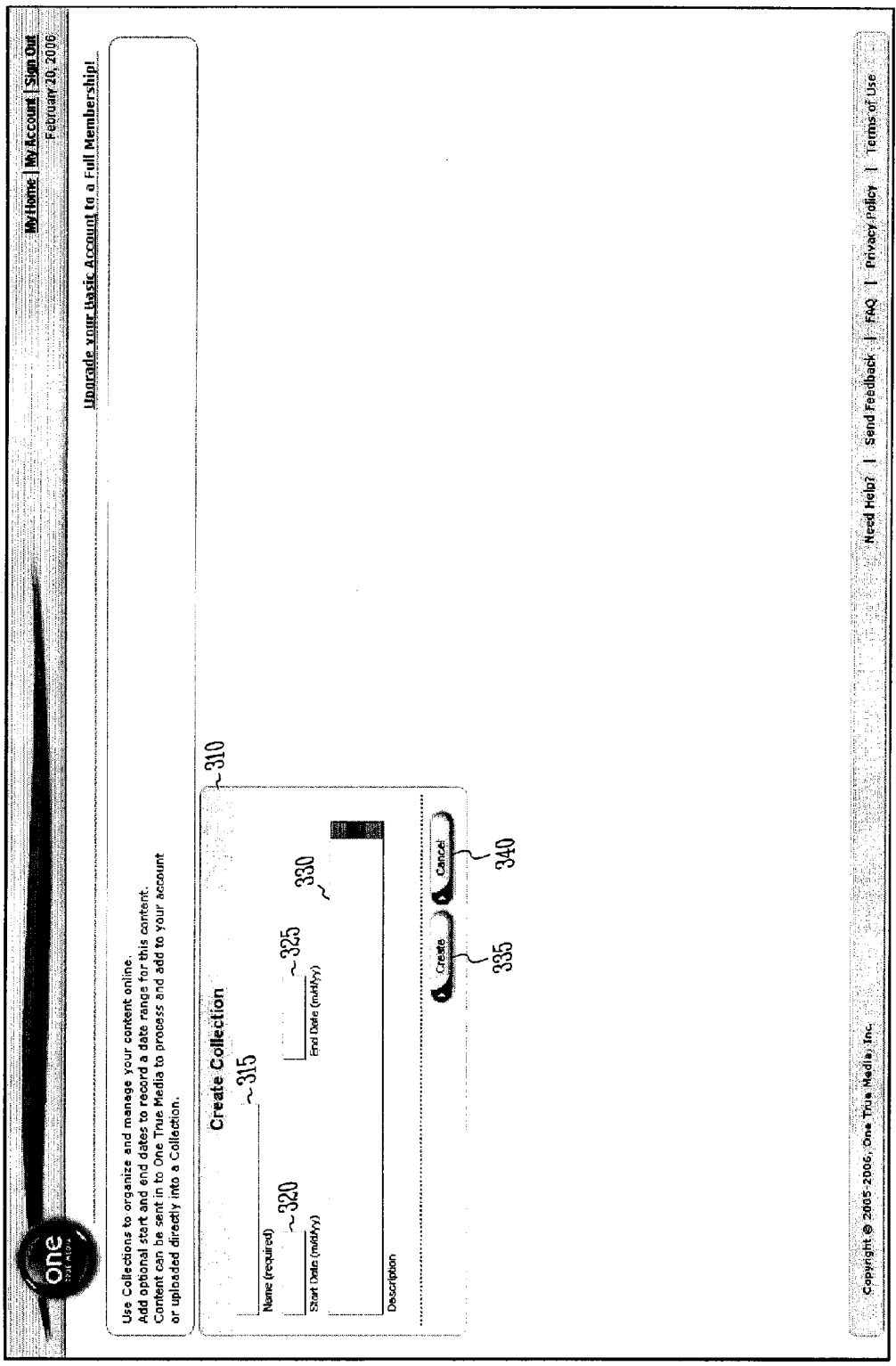
FIG. 3 is a screen shot of an example user web page providing an interface to create collections of content, provided by the system of FIG. 1.

FIG. 3 is a screen shot 300 that illustrates a first step in creating a collection at 310. A name 315 for the collection may be entered as well as started 320 and stop 325 dates. A description of the collection may also be provided by the user at 330 to help in the organization of the collection. Once the information is entered by the user, a create button 335 saves the data in the content library 145. A cancel button 340 may be selected to cancel the creation. The create button 335 takes the user to a screen to upload content from media attached to a computer running the browser. Such media may include a disk drive, camera, memory stick, or any other media coupled to the computer that stores digital content. The process of normalizing the inputs makes the rendering process simpler and faster. Speed may be further enhanced by down-resing for real-time online preview. In the case of video that is mailed from a user, it is normalized into two formats on upload, one of which is full resolution and one which is reduced resolution. In the case of video that is uploaded, it is normalized into a single format on upload, which is reduced resolution. The normalization into the full resolution format for uploaded video occurs when the montage is ordered and produced.

Figure 4:
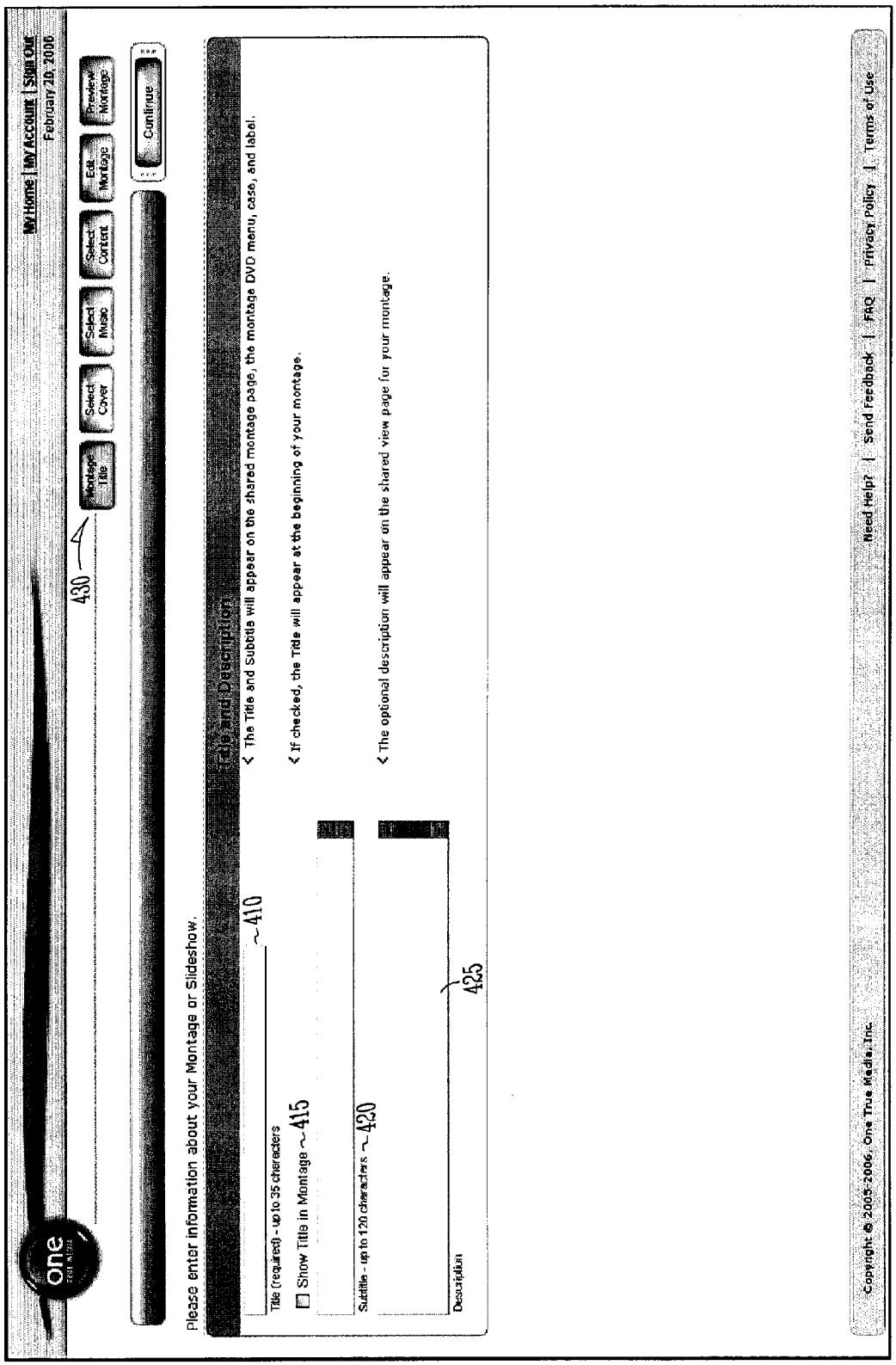
FIG. 4 is a screen shot of an example user web page providing an interface to create a title and other data for a project, provided by the system of FIG. 1.

Similarly, FIG. 4 shows a screen 400, that allows a user to create information identifying a video composition or slide show. At 410, the user is prompted for a title. A check button 415 allows the user to select whether to display the title in the video composition or slideshow. This is one example of text as one form of media which may be edited, and sequenced as with images and video clips. The text media may have effects, backgrounds and different fonts, colors, etc. At 420, the user may provide a subtitle, and a description at 425. At 430, several buttons are shown which illustrate the functions related to the creation process, such as the currently selected video composition title. Other functions, which in one embodiment are logically arranged, include selecting a cover, selecting music, selecting content, editing and previewing. These functions will be described in further detail in the following figures.

Figure 5:
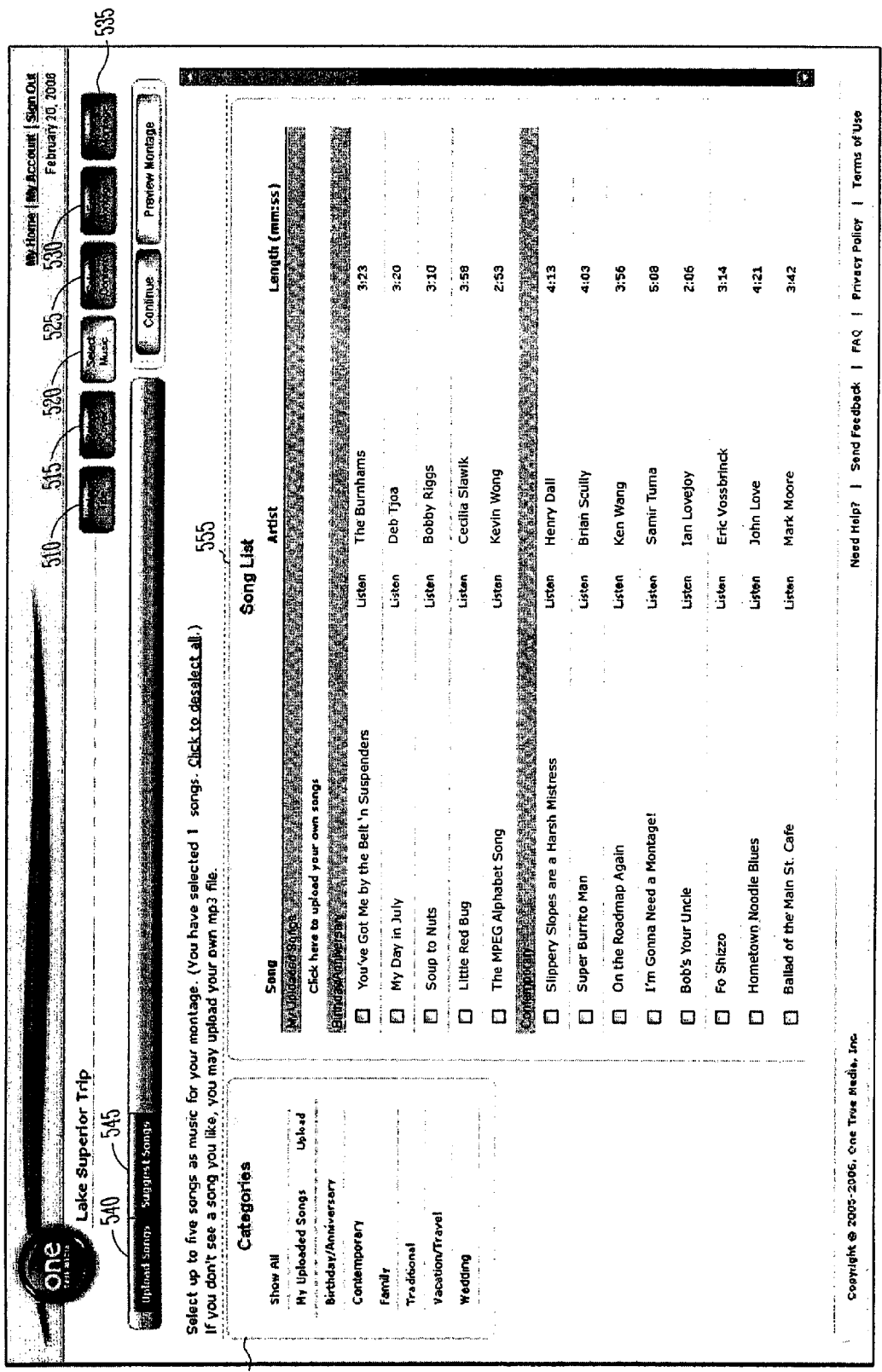
FIG. 5 is a screen shot of an example user web page providing an interface to select music for a project, provided by the system of FIG. 1.
Figure 6:
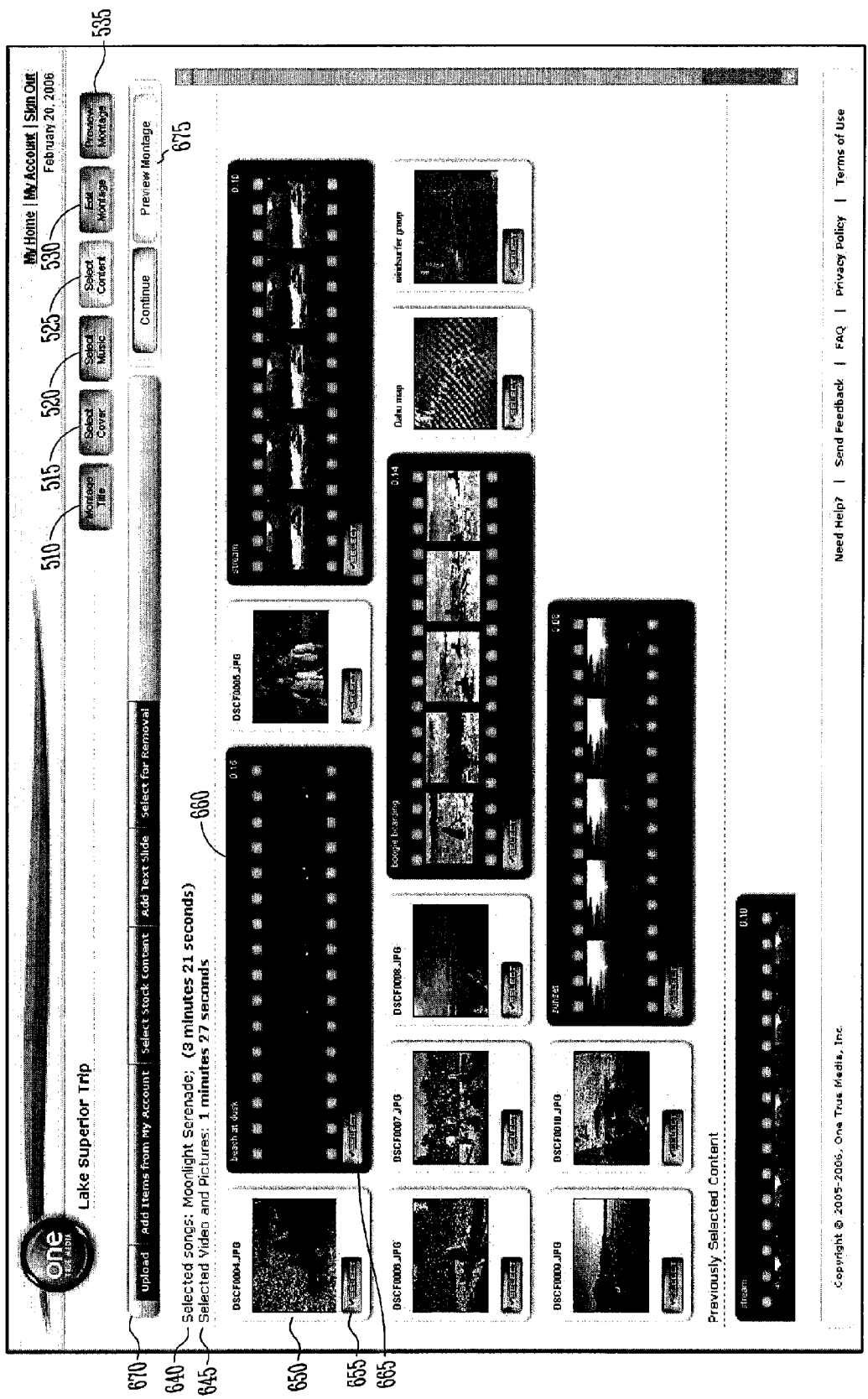
FIG. 6 is a screen shot of an example user web page providing an interface to select content for a project, provided by the system of FIG. 1.

FIG. 5 illustrates a music selection screen 500. The buttons 430 appear at the top of screen 500, and are numbered as follows: video composition title 510, select cover 515, select music 520, select content 525, edit video composition 530 and preview video composition 535. The select music button 520 is currently selected, and provides functions such as uploading songs 540 from another source, and suggesting songs 545, which may be tied into software that identifies songs as a function of information collected from the video composition title information entry screen corresponding to button 510. At 550, a list of categories of music available is provided. At 555, a song list is provided with check boxes to select the music desired for the creation. The title, author, and length are provided as well as a "listen" labeled link to hear the music.

Once the music has been selected, the user is moved on to a select content screen 600, corresponding to the function select content 525. The user may be automatically moved along the chain of functions by clicking on a button to indicate they are finished with the present screen.

Screen 600 identifies several items that are available for inclusion in the video composition being created. In one embodiment, information regarding the music selected 640 and length of time of all the content selected 645 is provided to the user. An image 650 is the first thing available, and is represented by a single lowest resolution thumbnail of the image. A checkbox is associated with the image at 655 and labeled "select", allowing the user to select whether or not to include it in the video composition. As can be seen in screen 600, there are several images available for selection, and they have been selected, as indicated by the corresponding checks in the checkboxes.

Screen 600 also contains several video clips, as represented by a series of thumbnails at 660. In one embodiment, a set number of thumbnails are used to represent a video clip regardless of the length of the clip. This provides a time independent representation of the clip, allowing users to focus on selection of content, rather than introducing temporal constraints into the creative process at this point in the creation of a video composition. As indicated in checkbox 665, clip 660 has been selected for the video composition. Other video clips are also indicated as selected by the corresponding check boxes. A content navigation strip of selections at 670 allows the user to upload further content, add items from the user account, select stock content, add text slides and select for removal. These selections provide content management functions. Clicking on a button representing the user is finished, or on edit video composition button 530 will move the user into the next step of the process.

Figure 7:
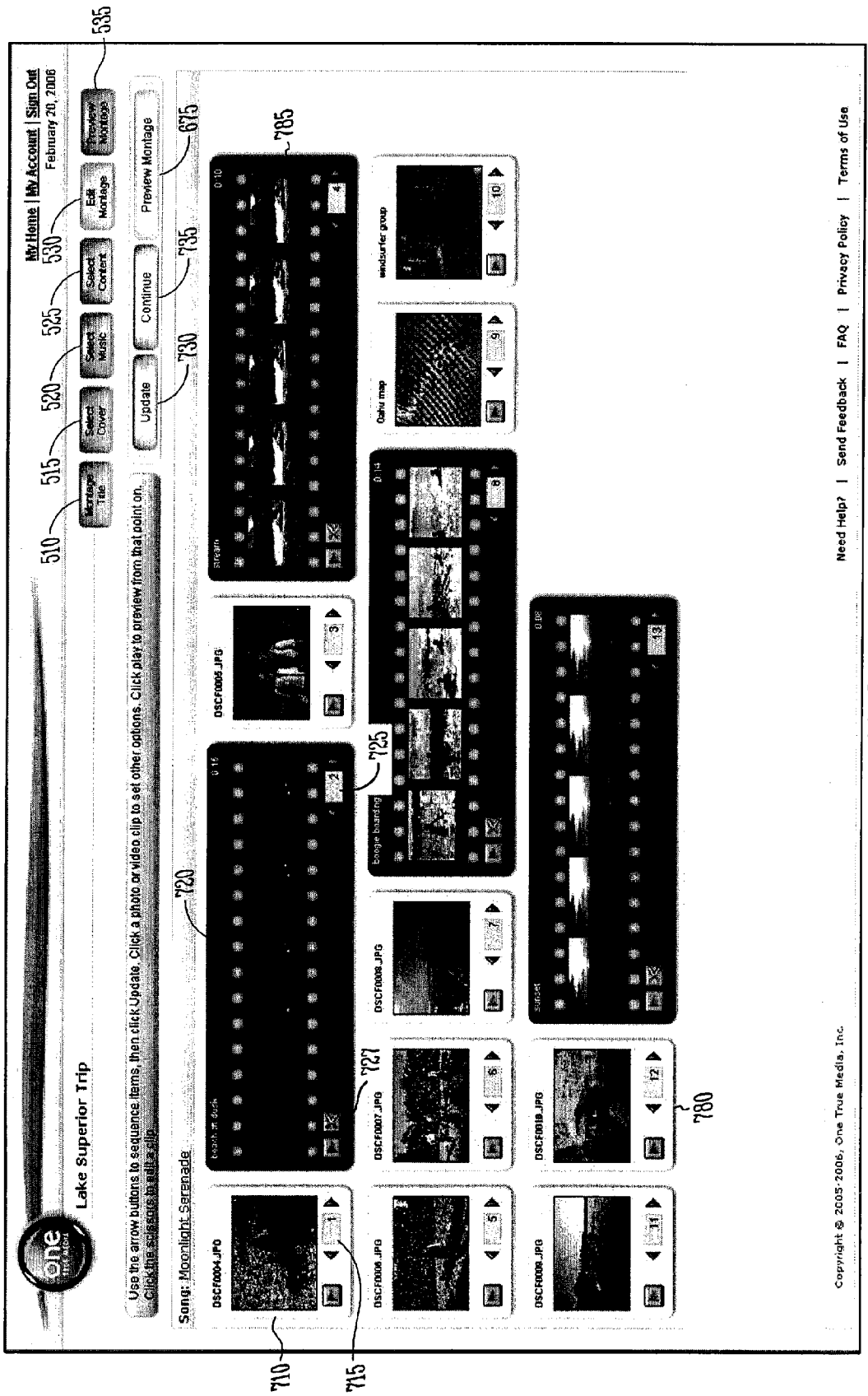
FIG. 7 is a screen shot of an example user web page providing an interface to sequence and edit content in a project, provided by the system of FIG. 1.

Screen 700 in FIG. 7 corresponds to the edit video composition selection 530. A first image at 710 begins the video composition. As seen just above the first image is the music selection, Moonlight Serenade. In one embodiment, each music selection includes a representation, such as a box, or heading, which logically correlates representations of content that will be displayed during playing of the music. If there were more songs and more content in this example, each song would similarly identify its corresponding content. The current position of image 710 is shown in a position indicator 715, as position number 1. The position may be changed by clicking on the arrows on either side of the position number to increase and decrease the number, or directly entering a desired sequence number in further embodiments.

The second piece of content 720 is a video clip, and also contains a position indicator 725. A scissor icon 727 is provided with each clip to allow the user to edit it. Each of the pieces of content or items has the position indicator which may be adjusted to sequence items. An update button may be selected at 730, which refreshes the screen 700 with the items in the newly selected sequence. The user may select to continue, at 735, or to preview the video composition at 675. In further embodiments, different means of organizing the sequence of clips, such as dragging and dropping the clips in the order desired may be used.

Figure 8:
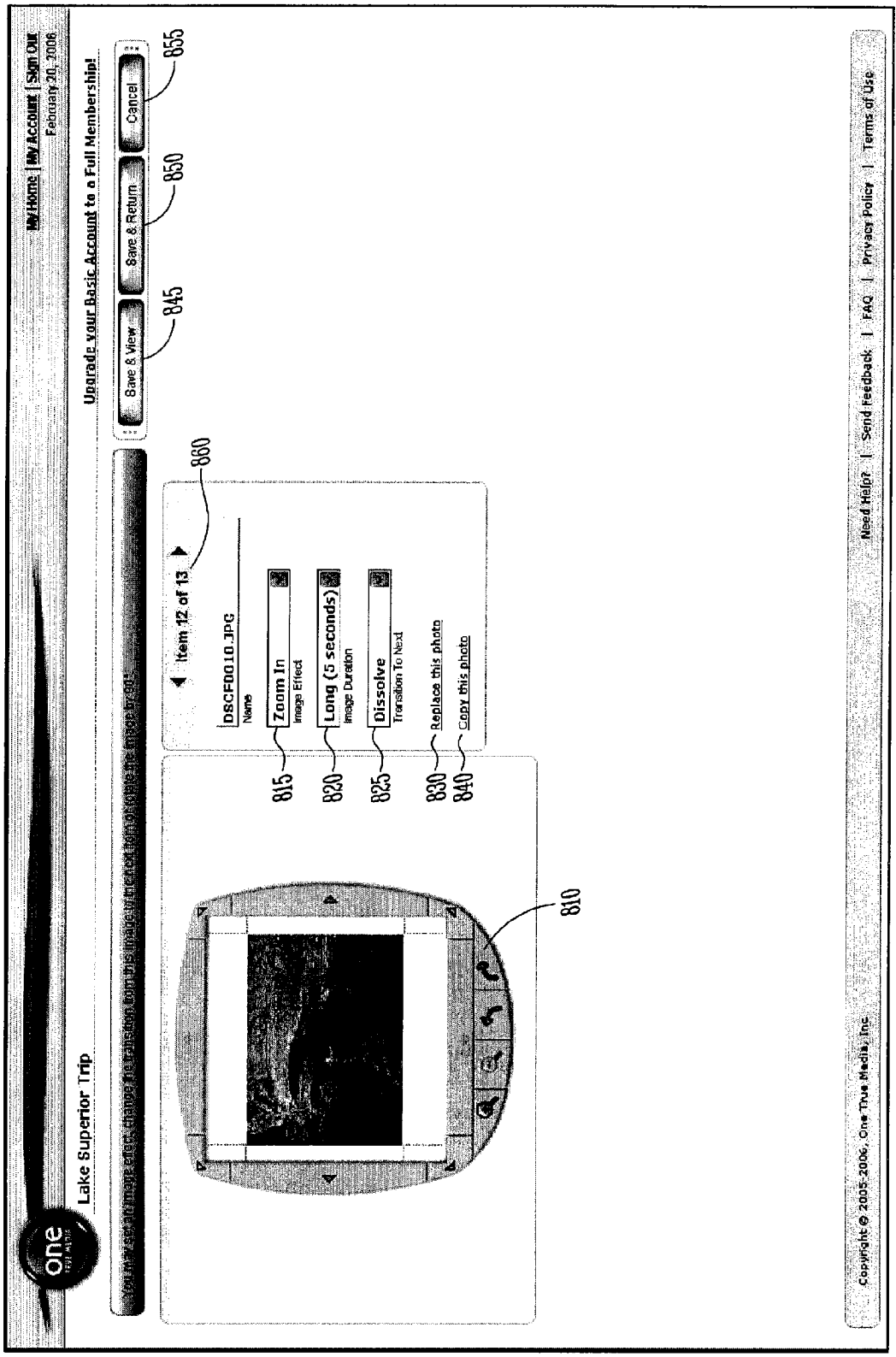
FIG. 8 is a screen shot of an example user web page providing an interface to edit an image in a project, provided by the system of FIG. 1.

The edit screen 700 also allows the user to select editing functions for the images and clips that is context sensitive, as illustrated with image 780 and clip 785. If the user clicks on image 780, editing functions for that image are presented to the user in screen 800 in FIG. 8. The medium resolution view of the image is provided, and surrounded by several editing functions at 810, such as rotate, magnify, and crop. Further options may be selected in pull down menus, such as zoom in 815, length of time to display the image 820 and transition effects to the next item at 825. The user may also be provided options to replace the image or photo at 830 and copy it at 840. Other functions may also be provided as desired. The user is also given selections to save and view at 845, save and return at 850 or cancel at 855. An item position indicator and selector may also be provided at 860, allowing the user to move back and forth between items in the video composition being edited.

Figure 9A:
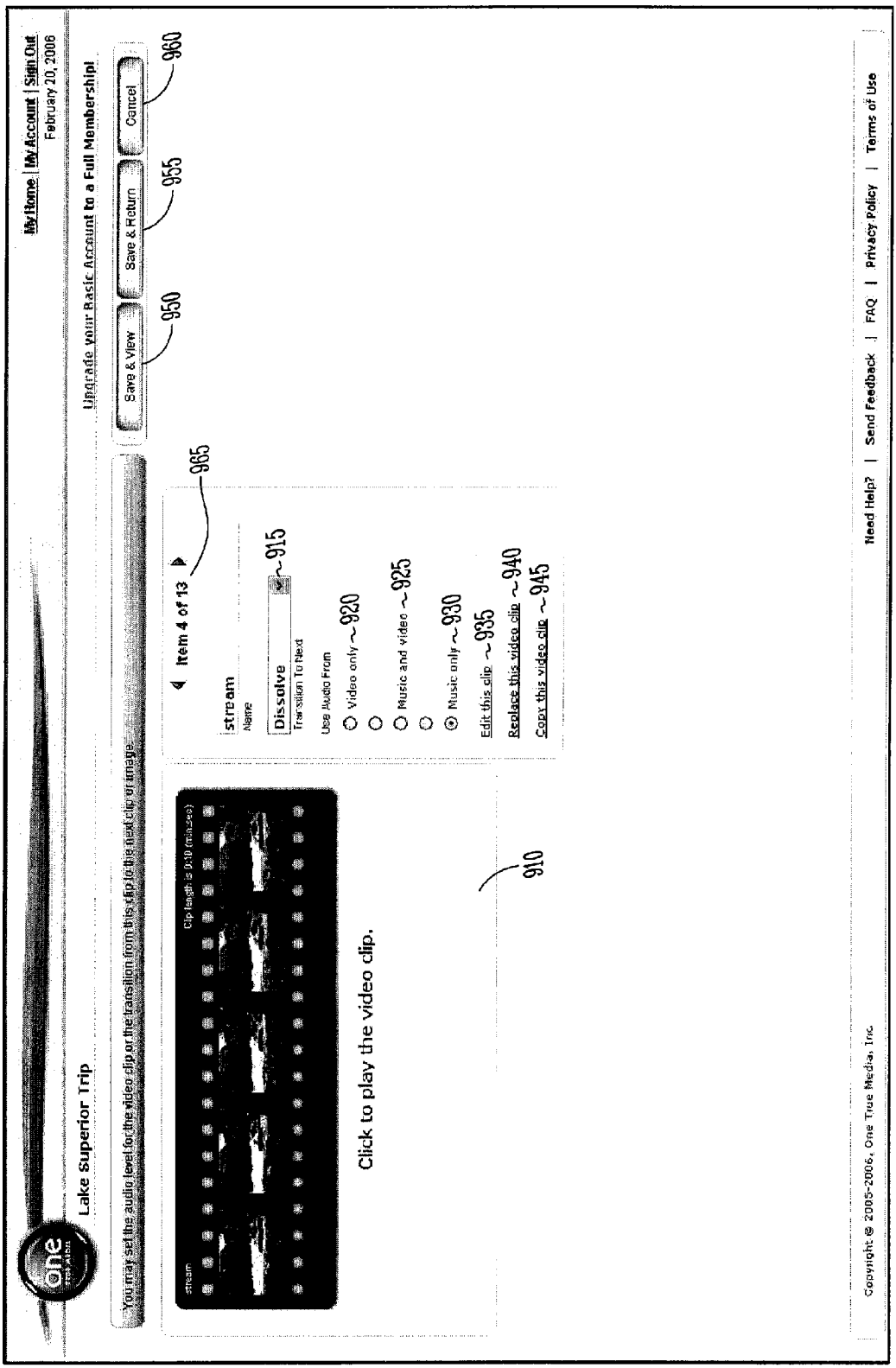
FIG. 9A is a screen shot of an example user web page providing an interface to edit a video clip in a project, provided by the system of FIG. 1.

Selecting clip 785 from edit screen 700 provides editing functions for the clip in screen 900 in FIG. 9A. An intermediate resolution view of the clip is provided at 910, and the user is allowed to click on it to play the clip. Editing functions provided include a transition to the next item at 915, and the ability to select the relative volume level of video and background music at 920, 925, and 930. Further clip editing functions may be selected at 935. The video clip may be replaced at 940 or copied at 945. The video clip may be saved and viewed at 950, saved and returned at 955 or the edits and selections may be cancelled at 960. Item selector 965 provides easy navigation between items in the video composition. Similarly, selecting a text thumbnail allows the user to edit the text using selected functions, such as font, font size, background, etc.

Figure 9B:
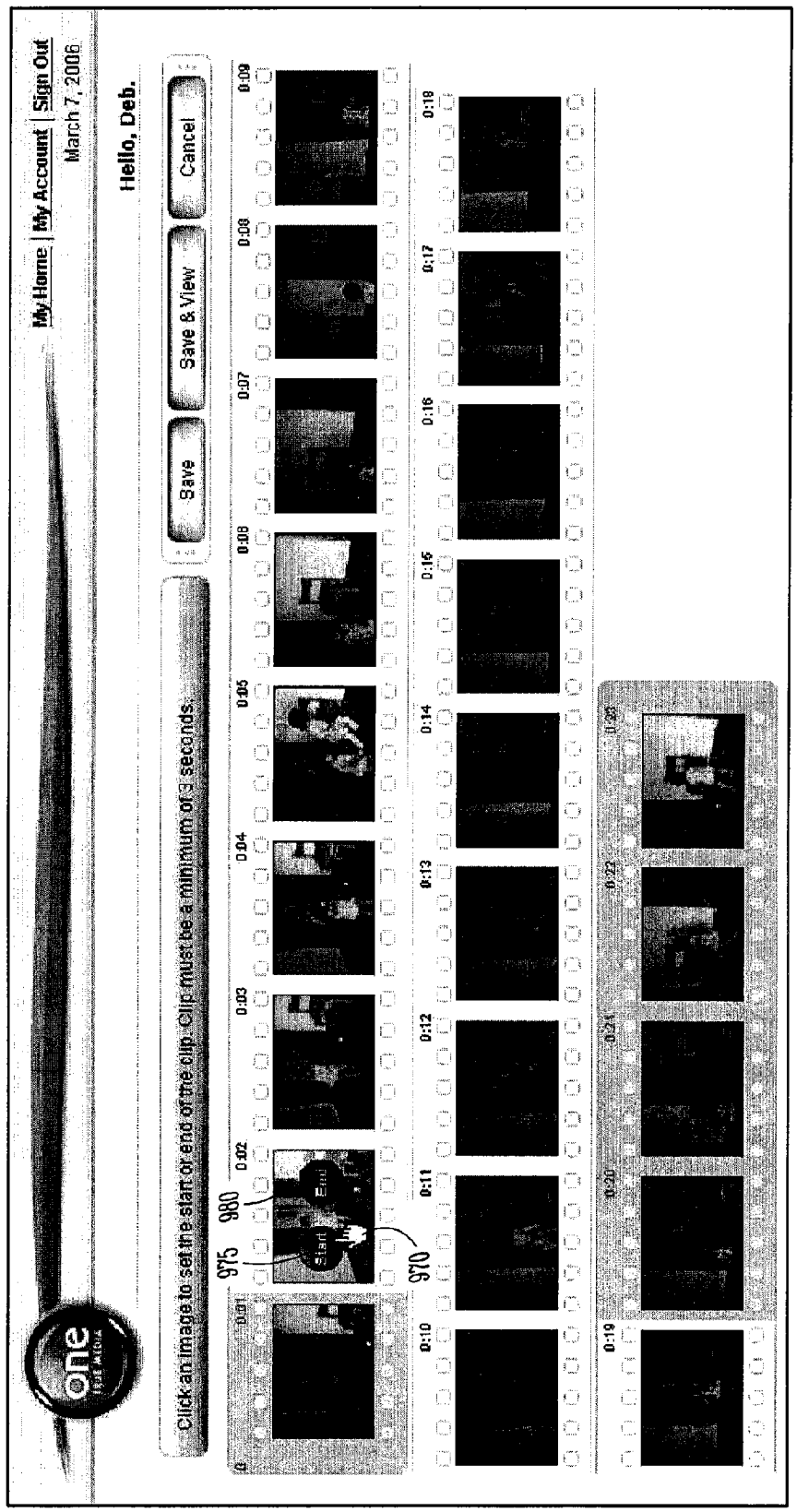
FIG. 9B is a screen shot of an example user web page illustrating editing of a video via a clipping interface, provided by the system of FIG. 1.

FIG. 9B is a screen shot of an example user web page illustrating editing of a video via a clipping interface via selection of the scissor icon 727 associated with a video clip. The clip is displayed as a sequence of thumbnail images, each image taken at a predetermined interval, such as one second. Other intervals, such as ½ second or 2 or 10 seconds may be used and be selectable by a user. As a cursor 970 is moved over each image, start 975 and stop 980 icons appear, and may be clicked on to identify a partial clip from the clip in the sequence. The editing may be cancelled or saved back into the sequence as desired.

Unless a video clip is clipped further, or the length of time an image or text is displayed or changed, the editing functions do not change the duration of a montage, and the timing of content in the sequence with respect to the music is not changed. This includes functions like different transitions between scenes. This can be very useful when editing and setting something to music. A user does not have to keep changing the timing of content later in the sequence to ensure they appear where desired in relation to the sound track.

Figure 10:
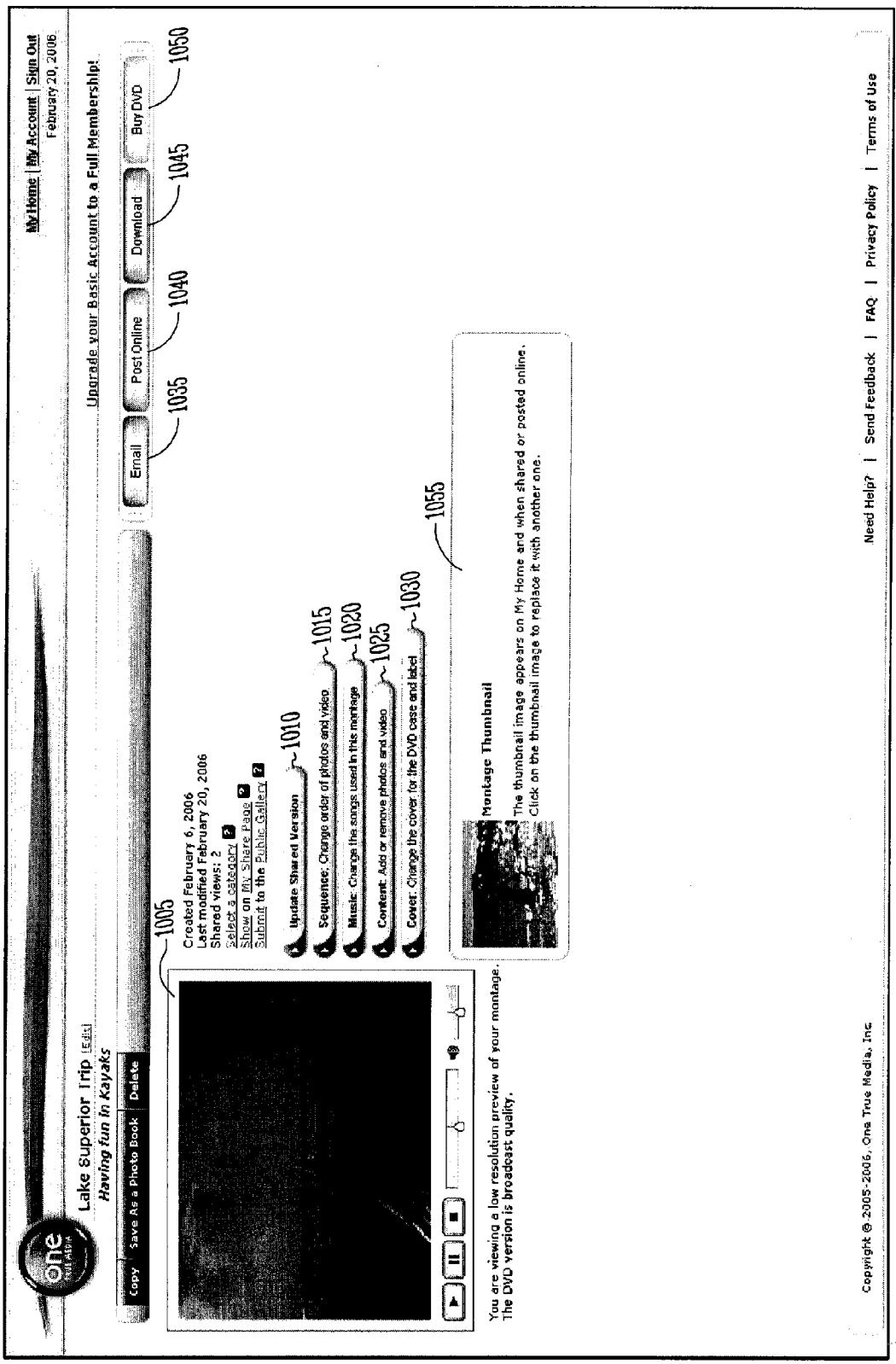
FIG. 10 is a screen shot of an example user web page providing a preview of a project, provided by the system of FIG. 1.

A preview screen 1000 is shown in FIG. 10, with the video composition about halfway through being previewed as indicated at 1005. As shown, the image or clip is played at the medium resolution, which is down resolutioned from the content source to allow easier streaming in real time via a network. Preview 1005 also contains common play back controls, such as start, stop, pause, volume and position indicators. Several functions are available from the preview screen 1000, such as the ability to update a shared version of video composition at 1010, return to the editing screen to sequence the video composition at 1015, changing the music at 1020, adding or removing content at 1025 and changing the cover at 1030.

The video composition may also be emailed at 1035, posted online at 1040, downloaded at 1045 and the user may also select to buy a DVD at 1050, which starts the process of rendering a high resolution version of the video composition and recording it onto suitable media. If the user clicks on the email function 1025, the user is provided a screen that allows the user to specify email addresses, and also include a message. A default message is provided that indicates the user should click on a provided link to view the video. At 1055, a thumbnail image used to represent the video composition is provided. This may be changed by clicking on it to replace it with another desired image.

Figure 11:
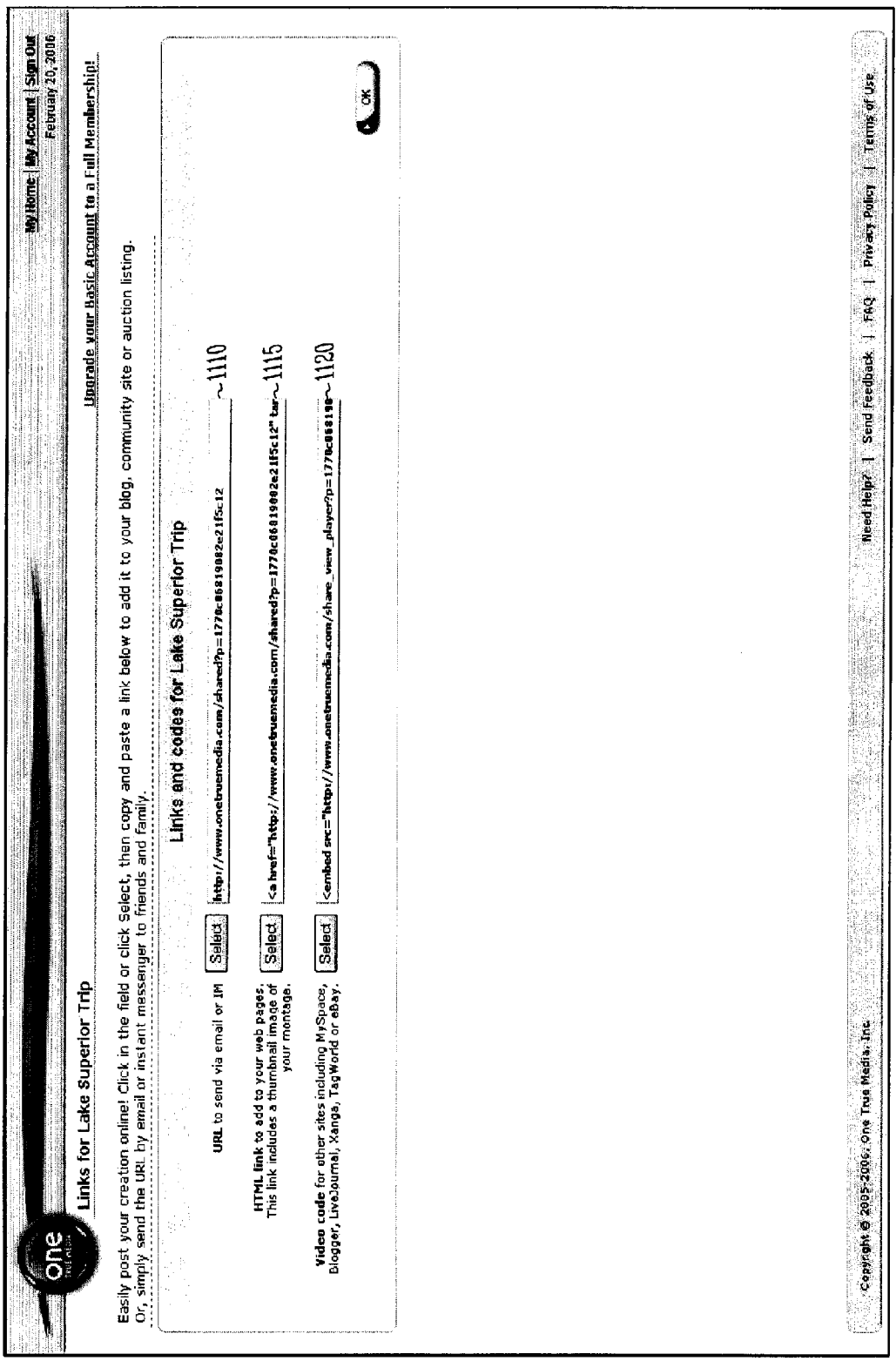
FIG. 11 is a screen shot of an example user web page providing an interface to create links for sharing a project, provided by the system of FIG. 1.

FIG. 11 is a screen shot 1100 illustrating methods to share the video composition with others. A URL or link may be emailed to others at 1110, a link that may be added to web pages, including a thumbnail of the video composition is enabled at 1115, and a video code for other sites is provided at 1120.

In one embodiment, the system provides a centralized content storage, management and editing system. Multiple users may access a project and collaborate on editing. Meta data for a project may be maintained based on the user that edited, allowing easy tracking of contributions to the final saved project. Each user may upload additional content and add it to projects. The uploads may be done directly into a project, or into selected collections as desired.

Current editing choices for images and clips may involve cropping and rotating for images, and clipping videos in two dimensions. Further features may be provided in further embodiments, such as additional editing choices for both clips and images.

In further embodiments, additional collaborative features may be provided. A project may be shared for external viewing. It can be edited further and the changes published to the shared view so all external viewers may see the new version when they next view that creation. An author/user can also allow a creation to be remixed. Remixing allows a viewer to reference the original content of the shared creation into their own account and edit it, add/remove/edit content, resequence, change music, etc, and republish it or order copies as if it was their own. Shared editing allows an author to create something and invite others to join the shared project as contributors. Contributors may add content to the shared project. The author may be able to allow contributors to participate in the editing process. In a further embodiment, the author may allow participation at a granular level of control over which users or types of users may perform certain actions on a project. In still further embodiments, individual items or pieces of content, or collections may be shared between different users.

In one embodiment, pre-defined templates may be used to help guide users through creation of a project. A template may be a pre-set series of images or clip slots and transitions, and perhaps stock items such as titles, transition images, closings, etc., into which a user may drop in their content to make a professionally designed montage, such as a book or video. Templates may be used to define the pace and pattern of the montage set to a corresponding soundtrack. The pre-set series of images or clip slots may specify the type of content to be added. In one example, a birthday party for child template may have slots that identify certain content that might commonly be available from a birthday party, such as blowing out candles, singing songs, and opening gifts among others.

In yet further embodiments, technologies may be added to the system to sense an uploaded audio track to determine a pace and pattern or template that may be compatible with it. This may make the user's task much easier by reducing video editing to simply selecting content and sequence by following system suggestions.

Figure 12:
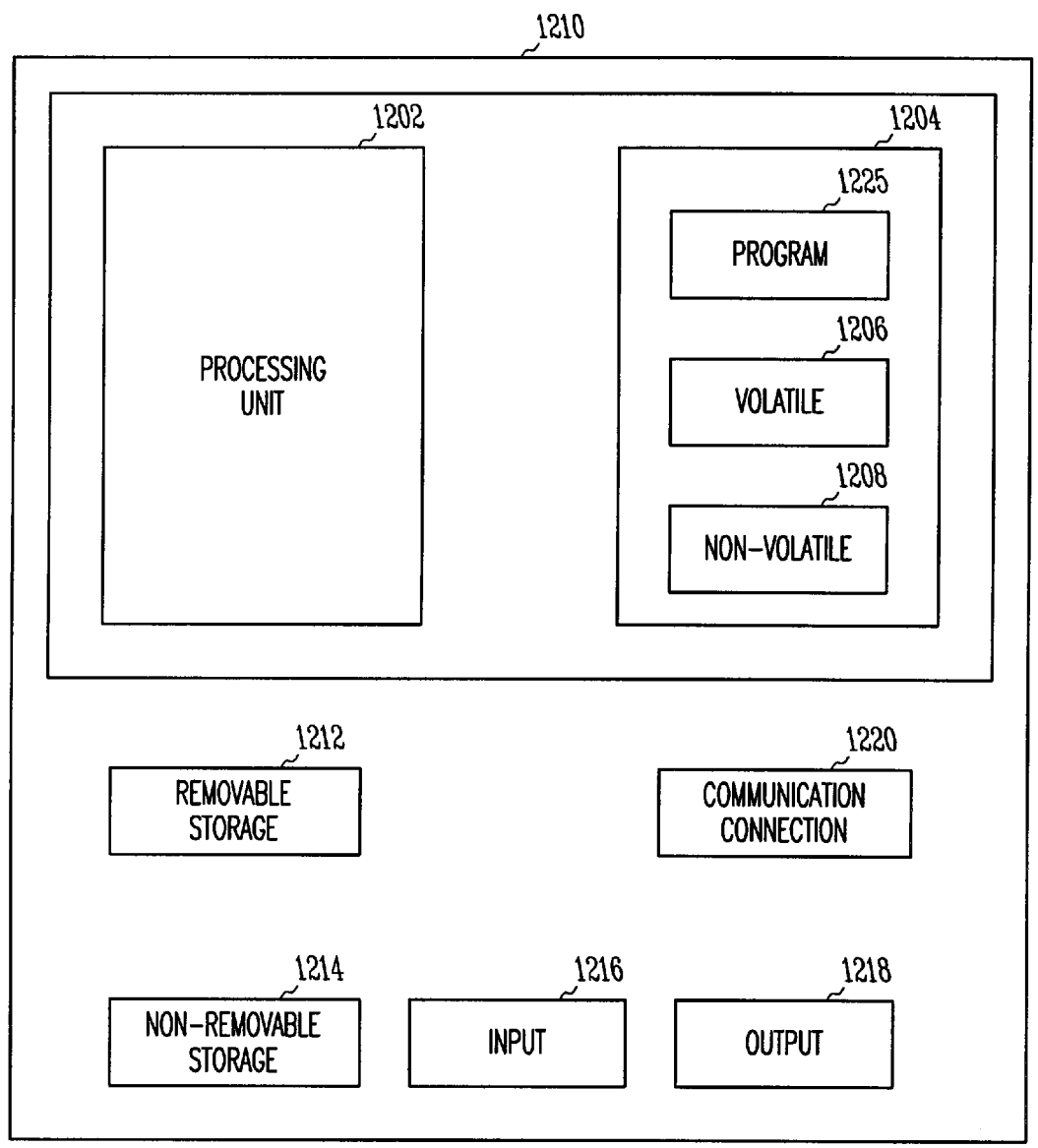
FIG. 12 is a block diagram of one typical computer system that can implement the system of FIG. 1 and also provide a browsing function for a user to interface with the system of FIG. 1 according to an example embodiment.

FIG. 12 is a block diagram of a typical computer system that can either be used by a user with a web browser to access the web based video editing system, or as a server for providing the functions of the web based video editing system. A general computing device in the form of a computer 1210, may include a processing unit 1202, memory 1204, removable storage 1212, and non-removable storage 1214. Memory 1204 may include volatile memory 1206 and non-volatile memory 1208. Computer 1210 may include—or have access to a computing environment that includes—a variety of computer-readable media, such as volatile memory 1206 and non-volatile memory 1208, removable storage 1212 and non-removable storage 1214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1210 may include or have access to a computing environment that includes input 1216, output 1218, and a communication connection 1220. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1202 of the computer 1210. A hard drive, CD-ROM, and RAM are some examples of articles including a computer-readable medium. For example, a computer program 1225 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 1210 to provide generic access controls in a COM based computer network system having multiple users and servers.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A web based server computer for creating a collaborative video composition, the computer comprising:
   a processing unit;
   a memory;
   a network connected interface generator controlled by the processing unit for providing web pages via a network;
   a content library that stores multiple versions of video clips at different resolutions in the memory;
   a project database that contains metadata for one or more projects corresponding to a video content comprising a plurality of the video clips, the one or more projects being edited by a plurality of users via the network for creating the collaborative video composition having a plurality of edits to the video content by the plurality of users, wherein the metadata allow tracking of each edit of the plurality of edits corresponding to each user of the plurality of users;
   a rendering engine controlled by the processing unit that provides a server video rendered down resolutioned video format preview of a user selected project for viewing by the plurality of users via the network by rendering the plurality of video clips using the metadata of the user selected project; and
   an editor controlled by the processing unit that provides a sequential view of the plurality of video clips for the user selected project to a user via the network, wherein the sequential view of the plurality of video clips comprises a plurality of thumbnail images of each video clip in the user selected project, wherein the plurality of thumbnail images are used to provide time-independent representation for each of the plurality of video clips in the user selected project;
   wherein a lower resolution version of the plurality of video clips is used when editing the one or more projects, and time stamp metadata corresponding to the editing is stored, and wherein the time stamp metadata is applied to a high resolution version of the plurality of video clips to produce an end product of the one or more projects.

2. The web based computer system of claim 1, wherein the preview is provided for viewing by the user from the stored versions.

3. The web based server computer of claim 2 wherein a first version of the video content comprises the high resolution version.

4. The web based server computer of claim 2 wherein a second version of the video content comprises a normalized version of the video content suitable for real time streaming over the network.

5. The web based server computer of claim 2 wherein a third version of the video content comprises thumbnails of the video content at a normalized resolution that provides a visual cue corresponding to the video content.

6. The web based server computer of claim 1 wherein the rendering engine applies the time stamp metadata to a down resolutioned version of the video content to provide the preview.

7. The web based server computer of claim 1 and further comprising an interface for rearranging the video content in sequence.

8. The web based server computer of claim 1 and further comprising means for selecting music for the one or more projects.

9. The web based server computer of claim 1 wherein the plurality of users include an author, and wherein the web based server system is configured to allow the author to control editing actions by other ones of the plurality of users.

10. The web based server computer of claim 1 wherein the server computer receives user-selected images obtained from the plurality of video clips, and generates a photo book using the user-selected images.

11. A server computer implemented method of interacting with a plurality of users for editing content stored on a network, the server computer having a processing unit and a memory, the method comprising:
providing, using the processing unit, pages to a web browser of each of the plurality of users to:
access content stored in a network content library that stores multiple versions of video clips at different resolutions in the memory;
edit one or more projects corresponding to a video content comprising a plurality of the video clips by the plurality of users via the network for creating a collaborative video composition having a plurality of edits to the video content by the plurality of users, wherein metadata for the one or more projects allow tracking of each edit of the plurality of edits corresponding to each user of the plurality of users;
render a down resolutioned video format preview of a user selected project in accordance with the metadata for viewing via the network, and wherein time stamp metadata corresponding to edits to the content at a lower resolution are applied to the content in a higher resolution to produce an end product; and
provide a sequential view of the plurality of video clips for the user selected project to a user via the network, wherein the sequential view of the plurality of video clips comprises a plurality of thumbnail images of each video clip in the user selected project, wherein the plurality of thumbnail images are used to provide time-independent representation for each of the plurality of video clips in the user selected project.

12. The method of claim 11 wherein thumbnails are provided to the web browser to represent the video content.

13. The method of claim 11 further comprising:
receiving user-selected images obtained from the plurality of video clips; and
generating a photo book using the user-selected images.

14. The method of claim 11 wherein the plurality of users include an author, and wherein the method further includes allowing the author to control editing actions by other ones of the plurality of users.

\* \* \* \* \*